US008845407B2

(12) United States Patent
Kojo et al.

(10) Patent No.: US 8,845,407 B2
(45) Date of Patent: Sep. 30, 2014

(54) DEVICE FOR PROVIDING A GAME

(71) Applicant: DeNA Co., Ltd., Tokyo (JP)

(72) Inventors: Taku Kojo, Tokyo (JP); Kazuyoshi Shiobara, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 13/900,847

(22) Filed: May 23, 2013

(65) Prior Publication Data

US 2013/0337919 A1 Dec. 19, 2013

(30) Foreign Application Priority Data

Jun. 15, 2012 (JP) ................................. 2012-136312

(51) Int. Cl.
*A63F 9/24* (2006.01)
*A63F 13/30* (2014.01)

(52) U.S. Cl.
CPC ...................................... *A63F 13/12* (2013.01)
USPC ............................................ 463/11; 273/292

(58) Field of Classification Search
CPC ............................. A63F 1/00; A63F 2300/204
USPC ............................................. 463/11; 273/292
See application file for complete search history.

(56) References Cited

U.S. PATENT DOCUMENTS 7,469,901 B1 * 12/2008 Hilliard ......................... 273/308

FOREIGN PATENT DOCUMENTS

JP 2002/052257 2/2002
JP 2002/369968 12/2002

OTHER PUBLICATIONS

Magic: The Gathering Online. Wikipedia.org. Online. Oct. 10, 2011. Accessed via the Internet. Accessed Mar. 8, 2014. <URL: https://web.archive.org/web/20111010191651/http://en.wikipedia.org/wiki/Magic:_The_Gathering_Online>.*
Nyxathid (Conflux). Gatherer.wizards.com. Online. Accessed via the Internet. Accessed Mar. 8, 2014. <URL: http://gatherer.wizards.com/Pages/Card/Details.aspx?multiverseid=186616>.*
Alara block. Wikipedia.org. Online. Accessed via the Internet. Accessed Mar. 8, 2014. <URL: http://en.wikipedia.org/wiki/Alara_block>.*
Japanese Office Action in connection with Japanese Patent Application No. 2012-136312 issued on Sep. 4, 2012.
Crime and Punishment: Successor of Universe, Dengeki Nintendo DS, Extra December issue, Dengeki Games vol. 2, ASCII Media Works, Inc., Dec. 1, 2009, vol. 9, No. 22, pp. 56 and 57.
Gigawing, Gamest, Shinseisha Inc., Apr. 15, 1999, vol. 14, No. 13, p. 159.
Statement of Certificate of Exception to Lack of Novelty in connection with Japanese Patent Application No. 2012-136312, Jul. 9, 2012.
"Sengoku Royale" http://sngk.mbga.jp/_sngk_to retrieved May 29, 2012.

* cited by examiner

*Primary Examiner* — Dmitry Suhol
*Assistant Examiner* — Carl V Larsen
(74) *Attorney, Agent, or Firm* — Pillsbury Winthrop Shaw Pittman LLP

(57) ABSTRACT

One object is to provide a game that continuously attracts players. In accordance with one aspect, a server device according to an embodiment provides a game wherein a first entity and a second entity battle with each other, and includes: an identification unit configured to identify first game contents on standby and second game contents on standby; a battle processing unit configured to compare, in an individual battle between first game contents selected from the first game contents on standby and second game contents selected from the second game contents on standby, a first estimation value regarding the selected first game contents with a second estimation value regarding the selected second game contents, thereby to determine an outcome of the individual battle; a point providing unit configured to provide the entities with points; and an exclusion unit configured to exclude a defeated game contents from the game contents on standby.

6 Claims, 11 Drawing Sheets

| Player Name | Player Identification |
|---|---|
| P1 | P001 |
| P2 | P002 |
| P3 | P003 |
| P4 | P004 |
| P5 | P005 |
| ... | ... |

Fig. 4

| Team Name | Team Identification | Identifications of Players Constituting the Team |
|---|---|---|
| T1 | T001 | P001, P010, P032, P052, P066, ...... |
| T2 | T002 | P002, P012, P022, P082, P099, ...... |
| T3 | T003 | P003, P014, P035, P044, P088, ...... |
| T4 | T004 | P004, P020, P030, P040, P050, ...... |
| ... | ... | ... |

Fig. 5

| Player Name | Player Identification | Card C1 (C001) | Card C2 (C002) | Card C3 (C003) | Card C4 (C004) | ... |
|---|---|---|---|---|---|---|
| P1 | P001 | P001C001 | P001C002 | 00000000 | P001C004 | ... |
| P2 | P002 | P002C001 | 00000000 | P002C003 | 00000000 | ... |
| P3 | P003 | 00000000 | P003C002 | 00000000 | P003C004 | ... |
| P4 | P004 | P004C001 | 00000000 | P004C003 | P004C004 | ... |
| ... | ... | ... | ... | ... | ... | ... |

Fig. 6

| Card Identification | Name | Level | Offensive Value | Physical Strength Value | Rarity Value | Attribute Value | ... |
|---|---|---|---|---|---|---|---|
| P001C001 | Soldier A | 5 | 10 | 20 | Normal+ | Water | ... |
| P001C002 | Soldier B | 3 | 20 | 15 | Normal | Fire | ... |
| ... | ... | ... | ... | ... | ... | ... | ... |
| P002C001 | Soldier A | 12 | 85 | 70 | Normal+ | Earth | ... |
| ... | ... | ... | ... | ... | ... | ... | ... |
| P002C020 | Wizard A | 5 | 2 | 15 | Rare | Water | ... |
| ... | ... | ... | ... | ... | ... | ... | ... |
| P003C001 | Soldier A | 22 | 90 | 80 | Normal+ | Earth | ... |
| ... | ... | ... | ... | ... | ... | ... | ... |
| P003C052 | Playboy | 1 | 5 | 2 | Rare+ | Fire | ... |
| ... | ... | ... | ... | ... | ... | ... | ... |
| P004C001 | Soldier A | 1 | 2 | 5 | Normal+ | Water | ... |
| ... | ... | ... | ... | ... | ... | ... | ... |

Fig. 7

| Player Identification | Player Deck Identification | Identifications of Cards Constituting Player Decks |
|---|---|---|
| P001 | PD001001 | P001C001, P001C012, P001C025, P001C026, P001C027, P001C035, P001C052, P001C085, P001C098, P001C102 |
| P002 | PD002001 | P002C005, P002C015, P002C035, P002C052, P002C085, P002C099, P002C102, P002C112, P002C185, P002C193 |
| ... | ... | ... |

Fig. 8

| Team Identification | Team Deck Identification | Identifications of Cards Constituting Team Decks |
|---|---|---|
| T001 | TD001001 | P001C001, P010C005, P032C015, P052C052, P066C005, P082C016, P098C023, P123C054, P134C010, P135C082 |
| T002 | TD002001 | P002C005, P012C025, P022C012, P082C001, P099C112, P111C023, P113C045, P139C001, P142C023, P158C002 |
| ... | ... | ... |

Fig. 9

| Team (Player) Identification | Identifications of Standby Cards | Identifications of Unavailable Cards |
|---|---|---|
| T001 | P001C001, P010C005, P032C015, P052C052, P066C005, P082C016, P098C023, P123C054, P134C010, P135C082 | N/A |
| T002 | P002C005, P012C025, P022C012, P082C001, P099C112, P111C023, P113C045, P139C001, P142C023, P158C002 | N/A |
| P001 | P001C001, P001C012, P001C025, P001C026, P001C027, P001C035, P001C052, P001C085, P001C098, P001C102 | N/A |
| ... | ... | ... |

Fig. 12

| Team (Player) Identification | Identifications of Standby Cards | Identifications of Unavailable Cards |
|---|---|---|
| T001 | P001C001, P010C005, P032C015, P052C052, P066C005, P082C016, P098C023, P123C054, P134C010, P135C082 | N/A |
| T002 | P012C025, P022C012, P082C001, P099C112, P111C023, P113C045, P139C001, P142C023, P158C002 | P002C005 |
| P001 | P001C001, P001C012, P001C025, P001C026, P001C027, P001C035, P001C052, P001C085, P001C098, P001C102 | N/A |
| ... | ... | ... |

Fig. 14

| Team (Player) Identification | Identifications of Standby Cards | Identifications of Unavailable Cards |
|---|---|---|
| T001 | P010C005, P032C015, P052C052, P066C005, P082C016, P098C023, P123C054, P134C010, P135C082 | P001C001 |
| T002 | P002C005, P012C025, P022C012, P082C001, P099C112, P111C023, P113C045, P139C001, P142C023, P158C002 | N/A |
| P001 | P001C001, P001C012, P001C025, P001C026, P001C027, P001C035, P001C052, P001C085, P001C098, P001C102 | N/A |
| ... | ... | ... |

Fig. 15

DEVICE FOR PROVIDING A GAME

CROSS-REFERENCE TO RELATED APPLICATIONS

This application is based on and claims the benefit of priority from Japanese Patent Application Serial No. 2012-136312 (filed on Jun. 15, 2012), the contents of which are hereby incorporated by reference in their entirety.

TECHNICAL FIELD

The present invention relates to a device for providing a video game.

BACKGROUND

Social games according to related art include a known video game wherein players battle with each other by using a concept of "deck" ("Sengoku Royale," [online], Apr. 20, 2010, DeNA Co., Ltd., [Searched on May 29, 2012], the Internet, <URL:http://sngk.mbga.jp/_sngk_top>). A deck is a game contents group composed of a plurality of game contents (such as character cards) selected from game contents owned by a player, and the game contents group is used by the player. The strength of a deck is determined based on, for example, characteristic values (e.g., offensive power and defensive power) assigned to each game content constituting the deck and combination of game contents constituting the deck (e.g., compatibility and special abilities produced by the combination). Additionally, teams each including a plurality of players can battle with each other (team battle).

However, a team battle in the above related art is basically performed individually between each player representing one team and each player representing the other team by using their own decks. The outcome of the entire team battle is determined in accordance with the numbers of wins and losses of the one-to-one battles. Accordingly, the outcome of such team battle is monotonously determined, and the players are unlikely to be continuously attracted.

SUMMARY

To overcome this problem, various embodiments of the present invention provide a video game that continuously attracts game players.

A server device according to an embodiment of the present invention provides a game wherein a first entity and a second entity battle with each other, and the server device comprises: an identification unit configured to identify a plurality of first game contents on standby among game contents available to the first entity and identify a plurality of second game contents on standby among game contents available to the second entity; a battle processing unit configured to compare, in an individual battle between a first game content selected from the plurality of first game contents on standby and a second game content selected from the plurality of second game contents on standby, a first estimation value calculated from a characteristic value of the first game content with a second estimation value calculated from a characteristic value of the second game content, thereby to determine an outcome of the individual battle; an exclusion unit configured to exclude the second game content determined to be a loser by the battle processing unit from the plurality of second game contents on standby; and a point providing unit configured to provide the first entity satisfying a predetermined condition in the individual battle with more points as a total number of the second game contents on standby in the individual battle is smaller.

A method according to an embodiment of the present invention uses a computer for providing a game wherein a first entity and a second entity battle with each other, and the method comprises: identifying a plurality of first game contents on standby among game contents available to the first entity and identifying a plurality of second game contents on standby among game contents available to the second entity; comparing, in an individual battle between a first game content selected from the plurality of first game contents on standby and a second game content selected from the plurality of second game contents on standby, a first estimation value calculated from a characteristic value of the first game content with a second estimation value calculated from a characteristic value of the second game content, thereby to determine an outcome of the individual battle; excluding the second game content determined to be a loser by the battle processing unit from the plurality of second game contents on standby; and providing the first entity satisfying a predetermined condition in the individual battle with more points as a total number of the second game contents on standby in the individual battle is smaller.

Various embodiments of the present invention provide a video game that continuously attracts game players.

BRIEF DESCRIPTION OF THE DRAWINGS

FIG. 4 schematically shows an example of a player management table managed by a player management unit 53 of the server device 10 according to an embodiment of the present invention.

FIG. 5 schematically shows an example of a team management table managed by a team management unit 54 of the server device 10 according to an embodiment of the present invention.

FIG. 6 schematically shows an example of a card management table managed by a card management unit 55 of the server device 10 according to an embodiment of the present invention.

FIG. 7 schematically shows an example of a characteristic value management table managed by a characteristic value management unit 56 of the server device 10 according to an embodiment of the present invention.

FIG. 8 schematically shows an example of a player deck management table managed by a player deck management unit 57 of the server device 10 according to an embodiment of the present invention.

FIG. 9 schematically shows an example of a team deck management table managed by a team deck management unit 58 of the server device 10 according to an embodiment of the present invention.

FIG. 12 schematically shows an example of a standby card management table managed by a standby card management unit 59 of the server device 10 according to an embodiment of the present invention.

FIG. 14 schematically shows an updated state of the standby card management table shown in FIG. 12.

FIG. 15 schematically shows an updated state of the standby card management table shown in FIG. 12.

DESCRIPTION OF EXAMPLE EMBODIMENTS

Figure 1:
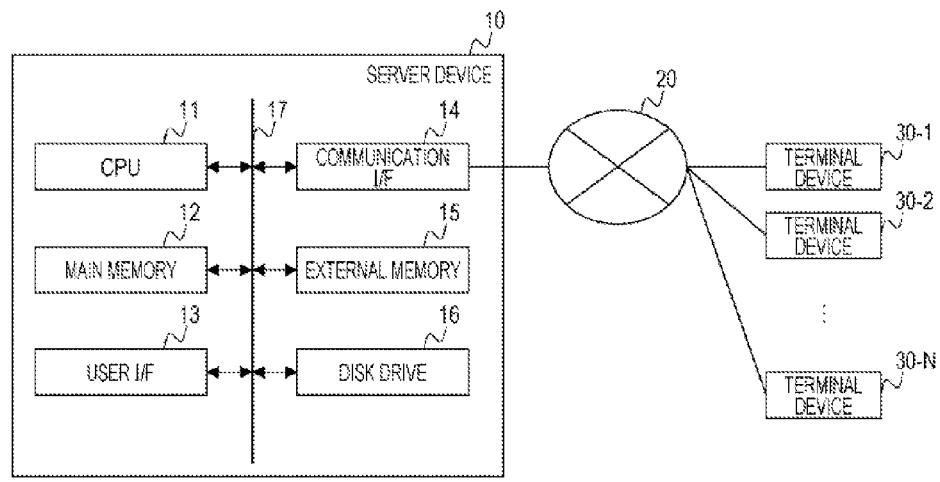
FIG. 1 is a block diagram schematically illustrating the architecture of a game system according to an embodiment of the present invention.

Various embodiments of the present invention will be described hereinafter with reference to the appended drawings. In the drawings, the same components are denoted by the same reference numerals.

FIG. 1 is a block diagram schematically illustrating the architecture of a game system according to an embodiment of the present invention. As illustrated in FIG. 1, an online game server device 10 (hereinafter also referred to simply as the "server device 10") may be communicatively connected to a plurality of terminal devices 30-1, 30-2, . . . , and 30-N (hereinafter also collectively referred to as the "terminal devices 30"), each having a communication function, via a communication network 20 such as the Internet. The server device 10 is an example of a device implementing part or all of a game system according to an embodiment of the present invention.

As illustrated in FIG. 1, the server device 10 may include a central processing unit (CPU) 11, a main memory 12, a user interface (I/F) 13, a communication I/F 14, an external memory 15, and a disk drive 16, and these components may be electrically connected to one another via a bus 17. The CPU 11 may load an operating system and various programs for controlling the progress of an online game into the main memory 12 from the external memory 15, and may execute commands included in the loaded programs. The main memory 12 may be used to store a program to be executed by the CPU 11, and may be formed of, for example, a dynamic random access memory (DRAM).

The user I/F 13 may include, for example, an information input device such as a keyboard or a mouse for accepting an input from an operator, and an information output device such as a liquid crystal display for outputting calculation results of the CPU 11. The communication I/F 14 may be implemented as hardware, firmware, or communication software such as a transmission control protocol/Internet protocol (TCP/IP) driver or a point-to-point protocol (PPP) driver, or a combination thereof, and may be configured to be able to communicate with the terminal device 30 via the communication network 20.

The external memory 15 may be formed of, for example, a magnetic disk drive, and store various programs such as a game program for allowing the terminal device 30 to execute an online game and a control program for controlling the progress of the online game. The game program may be created using, for example, Adobe Flash™, which is a format developed by Adobe Systems Incorporated to handle moving images, games, and the like. The game program created using Adobe Flash™ may be stored in the external memory 15 as a small web format (SWF) file. The game program will be described later. The disk drive 16 may read data stored in a storage medium such as a compact disc read only memory (CD-ROM), digital versatile disc read only memory (DVD-ROM), or DVD Recordable (DVD-R) disc, or writes data to such a storage medium. For example, data of a game program or the like stored in a storage medium may be read by the disk drive 16, and may be installed into the external memory 15.

The terminal device 30 may be any information processing device capable of executing and operating a game program stored on the server device 10 and displayed on a web browser, non-limiting examples of the terminal device 30 including a mobile phone, a smartphone, a game console, a personal computer, a tablet, or an electronic book reader. Additionally, the terminal device 30 may be capable of receiving a game program from the server device 10 through a communication I/F 34 (described later) for executing the game.

Figure 2:
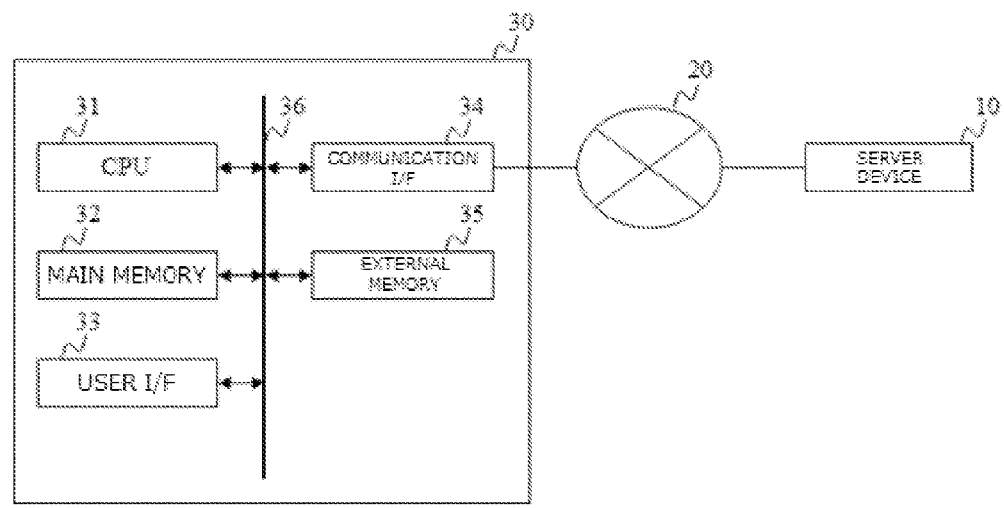
FIG. 2 is a block diagram schematically illustrating the architecture of a terminal device 30 according to an embodiment of the present invention.

The architecture of these various terminal devices 30 will be described with reference to FIG. 2. FIG. 2 is a block diagram schematically illustrating the architecture of a terminal device 30 according to an embodiment of the present invention. As illustrated in FIG. 2, the terminal device 30 may include a central processing unit (CPU) 31, a main memory 32, a user interface (I/F) 33, a communication I/F 34, and an external memory 35, and these components may be electrically connected to one another via a bus 36.

The CPU 31 may load various programs such as an operating system into the main memory 32 from the external memory 35, and may execute commands included in the loaded programs. The main memory 32 may store a program to be executed by the CPU 31, and may be formed of, for example, a dynamic random access memory (DRAM).

The user I/F 33 may include, for example, an information input device such as a touch panel, a keyboard, a button, and a mouse for accepting an input from a player (user), and an information output device such as a liquid crystal display for outputting calculation results of the CPU 31. The communication I/F 34 may be implemented as hardware, firmware, or communication software such as a transmission control protocol/Internet protocol (TCP/IP) driver or a point-to-point protocol (PPP) driver, or a combination thereof, and may be configured to be able to communicate with the server device 10 via the communication network 20.

The external memory 35 may comprise, for example, a magnetic disk drive or a flash memory and store various programs such as an operating system. When receiving a game program from the server device 10 via the communication I/F 34, the external memory 35 may store the received game program.

The terminal device 30 having such architecture may be provided with, for example, browser software for interpreting a hypertext markup language (HTML) file and displaying a screen, and plug-in software (e.g., Flash Player distributed by Adobe Systems Incorporated) incorporated in the browser software. The terminal device 30 may acquire an SWF file embedded in an HTML file from the server device 10, and execute the SWF file using the browser software and plug-in software, and therefore the user of the terminal device 30, or a game player, may be provided with a gaming function.

A game program will be described with reference to FIGS. 1 and 2. The game program may be stored on the external memory 15 of the server device 10 in various forms. For example, the game program may be provided as a piece of application software executable on various application execution platforms. The player is able to execute or operate a game application using the terminal device 30.

The external memory 15 of the server device 10 may store game programs for executing or operating various games executable or operable on the terminal device 30. The game programs may be created using, for example, script languages such as ActionScript™ and JavaScript™, or object-oriented programming languages such as Objective-C™ and Java™. The game programs may be executed and/or operated on a platform installed on the terminal device 30. A game program to be stored on the external memory 15 may be produced by modifying a web page created in a markup language such as HTML5 by using a style sheet such as Cascading Style Sheet 3 (CSS3). Such a web page created in a markup language may be executed or operated by the browser software installed on the terminal device 30. The external memory 15 of the server device 10 may store a desired number of game programs, and a game program for executing and/or operating a game selected by the terminal device 30 may be provided to a desired number of terminal devices 30 via the communication I/F 14 in accordance with control of the CPU 11. In the terminal device 30, the game program sent from the server device 10 may be received via the communication I/F 34 and may be transferred to the external memory 35 for storage in accordance with control of the CPU 31.

The user of the terminal device 30 may execute or operate the game program to play various games such as action games, role-playing games, interactive baseball games, and card games. The types of the games implemented by the game program are not limited to those explicitly disclosed herein. When a game is executed, for example, animation or an operation icon designated by the program may be displayed on a screen of the terminal device 30. The player may enter an instruction for causing the game to progress using an input interface (e.g., a touch screen or a button) of the terminal device 30. The instruction entered by the player may be transmitted to the server device 10 through the browser of the terminal device 30 or a platform function such as NgCore™. The terminal device 30 may send information indicating various parameters (such as the number of game points earned and information concerning obtained items) used in the game, and information indicating the status of the game (such as information specifying which mission has been fulfilled) to the server device 10, if necessary. The server device 10 may manage the progress of the individual players in the game in accordance with information received from the plurality of terminal devices 30, such as instructions, information indicating the parameters, and information indicating the statuses. Thus, each player is able to resume the interrupted game from the point where it was interrupted, on the basis of the information concerning the progress of the game held in the server device 10.

Figure 3:
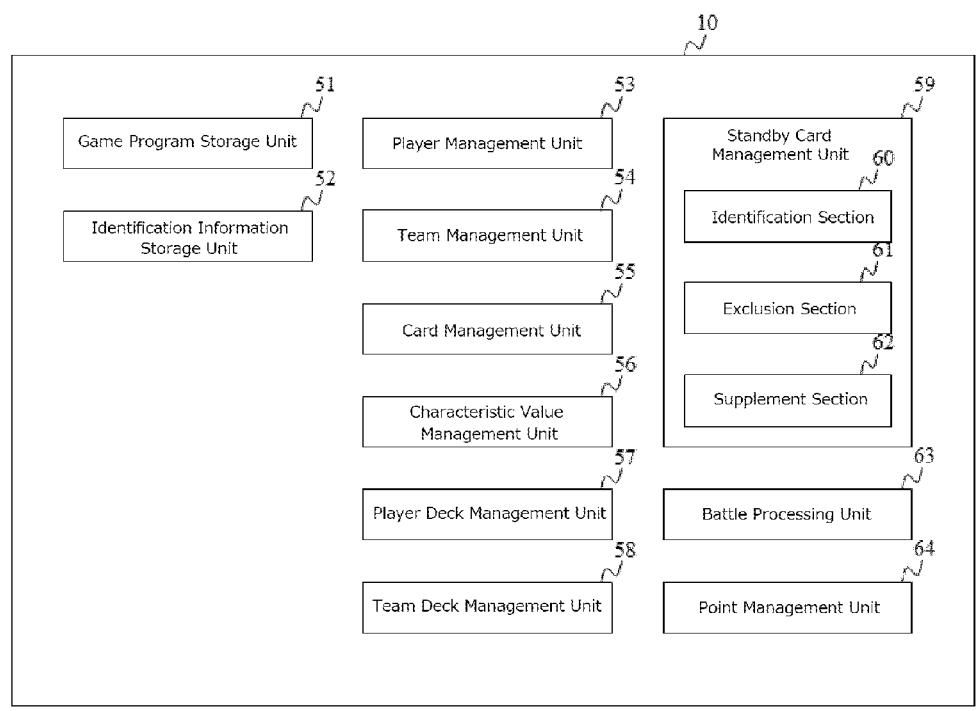
FIG. 3 is a block diagram illustrating the functionality of a server device 10 according to an embodiment of the present invention.

Next, the functionality of the server device 10 implemented by the components shown in FIG. 1 will be described with reference to FIG. 3. FIG. 3 is a block diagram illustrating the functionality of a server device 10 according to an embodiment of the present invention. As shown in FIG. 3, The server device 10 according to the embodiment includes a game program storage unit 51, an identification information storage unit 52, a player management unit 53, a team management unit 54, a card management unit 55, a characteristic value management unit 56, a player deck management unit 57, a team deck management unit 58, a standby card management unit 59, a battle processing unit 63, and a point management unit 64.

For this embodiment, a game wherein one entity battles with another entity will be described. An entity is a subject that constitutes a party in an interactive battle game wherein one party battles with another party. Examples of a subject include one player operated by a human, a team consisting of a plurality of players operated by humans, one player operated by a computer, and/or a team consisting of a plurality of players operated by computers. In this embodiment, cards (game contents) that can be used by an entity include: cards individually owned by players; cards owned by a team including the player; cards owned by another player of the team including the player; cards of an opponent team defeated in a battle by the player; cards of an opponent team defeated in a battle by another player of the team including the player; and cards owned by a company player who is not included in the team including the player but is associated with the player.

The game program storage unit 51 may store game programs for executing or operating various games executable or operable on the terminal device 30. A user of the terminal device 30 may obtain game programs stored on the game program storage unit 51 and run the obtained game programs on the terminal device 30, thereby to play the game on the terminal device 30. As stated above, various games may be performed on the terminal device 30. The games performed on the terminal device 30 may use various game contents such as electronic cards, items, and virtual currency used in the games.

The term "game contents" collectively refers to electronic data used by players for progressing the games and including, for example, cards, items, avatars, and virtual currency. Cards serving as game contents may have, for example, characteristic values assigned thereto that are necessary for progression of the game (e.g., "name of game content," "offensive value," "physical strength value," "defensive value," "rarity value," and "attribute value"). At least part of these characteristic values may be updated in accordance with progression of the game. A player can progress the game using the card having updated characteristic values. A game that uses a card as a game content may be called a card game. In the card game, a player can own one or more cards and use the cards to fulfill a mission and battle with other players and enemy characters, thereby progressing the game.

The identification information storage unit 52 may store various identification information managed by the player management unit 53, the team management unit 54, the card management unit 55, the characteristic value management unit 56, the player deck management unit 57, the team deck management unit 58, and the standby card management unit 59.

The player management unit 53 may manage a plurality of players to be provided with a game from the server device 10. More specifically, the player management unit 53 may generate a management table (player management table) as shown in, e.g., FIG. 4, and the management table may be stored in the identification information storage unit 52. As shown in FIG. 4, the player management unit 53 may assign each player (e.g., player P1) a player identification (e.g., P001) identifying the player; the player identification may be stored in the identification information storage unit 52.

The team management unit 54 may manage teams consisting of a plurality of players. More specifically, the team management unit 54 may generate a management table (team management table) as shown in, e.g., FIG. 5, and the management table may be stored in the identification information storage unit 52. As shown in FIG. 5, the team management unit 54 may assign each team (e.g., team T1) a team identification (e.g., T001) identifying the team and player identifications identifying the players constituting the team (P001, P010, P032, P052, and P066); these identifications may be stored in the identification information storage unit 52. This team management table may identify the players constituting a team.

The card management unit 55 may manage which cards are owned by players. More specifically, the card management unit 55 may generate a management table (card management table) as shown in, e.g., FIG. 6, and the management table may be stored in the identification information storage unit 52. As shown in FIG. 6, the card management unit 55 may assign each player (e.g., player P1) card identifications identifying the cards owned by the player; the card identifications may be stored in the identification information storage unit 52. In FIG. 6, player P1 and player P2 are respectively assigned card identifications P001C001 and P002C001 for the card C1 corresponding to, for example, soldier A. Player P3, who does not own this card, is assigned the card identification 00000000.

This card management table may identify the cards owned by a player among cards usable in a game. The card management unit 55 may also manage cards available to players, as well as cards owned by the players.

The characteristic value management unit 56 may manage characteristic values assigned to cards owned by all the players. More specifically, the characteristic value management unit 56 may generate a management table (characteristic value management table) as shown in, e.g., FIG. 7, and the management table may be stored in the identification information storage unit 52. As shown in FIG. 7, the characteristic value management unit 56 may assign a plurality of characteristic values to each card, and the plurality of characteristic values may be stored in the identification information storage unit 52. FIG. 7 shows examples of characteristic values: name, level, offensive value, physical strength value, rarity value, and attribute value. This characteristic value management table may identify how characteristic values of each card are currently set.

The player deck management unit 57 may handle the concept of "player deck." "A player deck" may be a card group (game content group) consisting of cards (game contents) selected from cards (game contents) owned by a player, and used only by the player.

The player deck management unit 57 may manage what player decks are owned by players. More specifically, the player deck management unit 57 may generate a management table (player deck management table) as shown in, e.g., FIG. 8, and the management table may be stored in the identification information storage unit 52. As shown in FIG. 8, the player deck management unit 57 may assign, to each player (e.g., player P1 identified by the player identification P001), a player deck identification (PD001001) identifying a player deck owned by the player, card identifications (P001C001, P001C012, P0001C025, P001C026, P001C027, P001C035, P001C052, P001C085, P001C098, and POO1C102) identifying cards constituting the player deck; and these identifications may be stored in the identification information storage unit 52. The player deck management table may identify which cards owned by the player constitute the player deck owned by the player.

The team deck management unit 58 may handle the concept of "team deck." "A team deck" may be a card group (game content group) consisting of cards (game contents) selected from cards (game contents) owned by a plurality of players constituting a team, and used only by the team.

The team deck management unit 58 may manage what team decks are owned by teams. More specifically, the team deck management unit 58 may generate a management table (team deck management table) as shown in, e.g., FIG. 9, and the management table may be stored in the identification information storage unit 52. As shown in FIG. 9, the team deck management unit 58 may assign, to each team (e.g., team T1 identified by the team identification T001), a team deck identification (TD001001) identifying a team deck owned by the team and card identifications (P001C001, P0100005, P032C015, P052C052, P066C005, P082C016, P098C023, P123C054, P134C010, and P135C082) identifying the cards constituting the team deck; and these identifications may be stored in the identification information storage unit 52. The team deck management table may identify which cards owned by which players constitute the team deck owned by the team.

Each of the above described management tables are mere examples and may be replaced with other desired techniques to achieve the purpose of identifying players, teams, players constituting teams, cards, player decks, cards constituting player decks, team decks, cards constituting team decks, and characteristic values assigned to cards.

The standby card management unit 59 may manage which of the cards available are standby cards in a battle, for each of one entity (e.g., one player or team) and another entity (e.g., one player or team) battling with each other. More specifically, the standby card management unit 59 may include an identification section 60, an exclusion section 61, and a supplement section 62. The identification section 60 may identify standby cards from the cards available to each entity. The exclusion section 61 may exclude a card determined to be a loser by the battle processing unit 63 from standby cards of each of one entity and another entity battling with each other. The supplement section 62 may supplement the standby cards with a card selected from the cards available to an entity (e.g., a card excluded as a loser by the exclusion section 61 and a new card that has not been excluded by the exclusion section 61).

The battle processing unit 63 processes a battle between one entity and another entity. More specifically, the battle processing unit 63 may compare, for example, an estimation value calculated by using a characteristic value assigned to a card selected from standby cards of one entity, and an estimation value calculated by using a characteristic value assigned to a card selected from standby cards of another entity, thereby to process a battle between one entity and the other entity.

The point management unit 64 may provide points to one entity that has satisfied a predetermined condition through the battle processing unit 63 in the battle, in accordance with the total number of standby cards of the other entity opposing the one entity. More specifically, the point management unit 64 may provide points to one entity that has satisfied a predetermined condition, in inverse proportion to the total number of standby cards of the other entity opposing the one entity. The above predetermined condition may be, for example, that the entity defeated a card of the opposing entity or that the entity caused damage to a card of the opposing entity.

Figure 10:
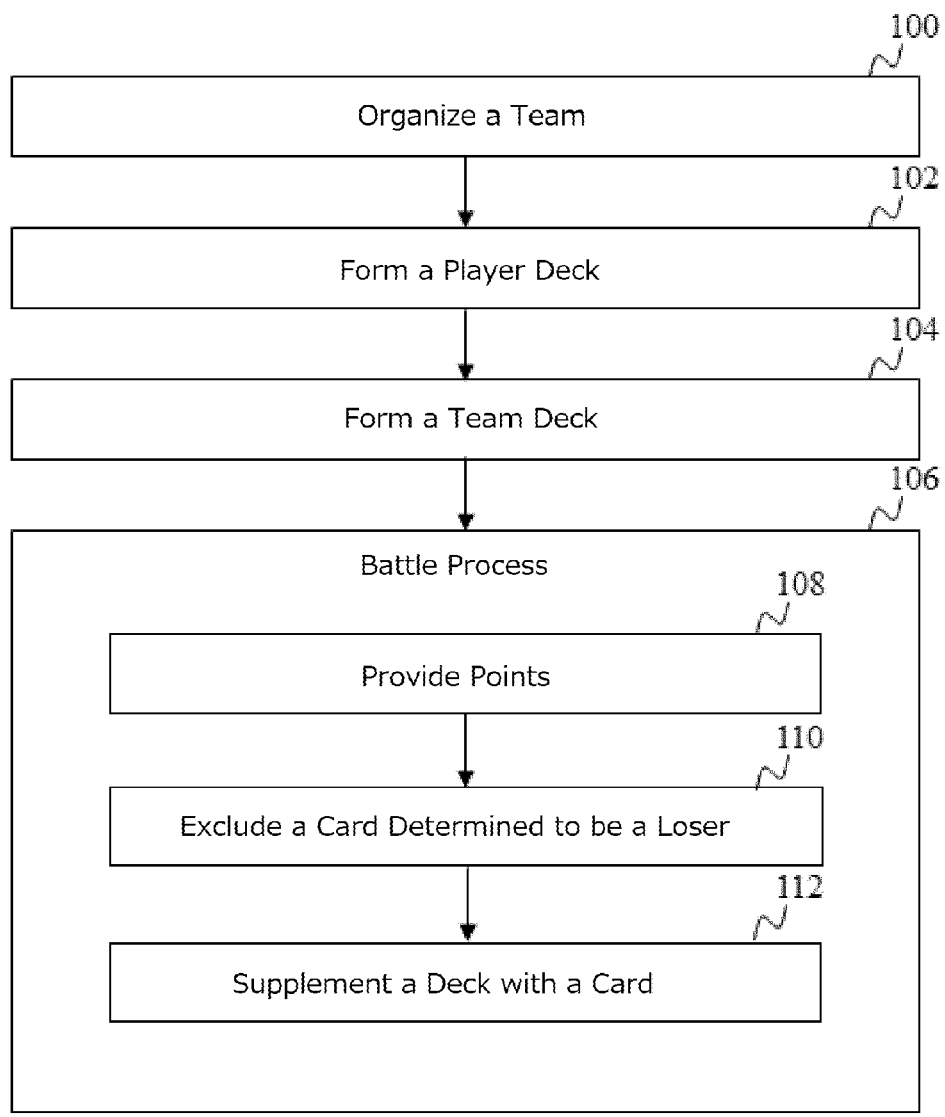
FIG. 10 is a flow diagram showing an operation performed during a game play by the server device 10 according to an embodiment of the present invention.

Next, reference is made to FIG. 10 to describe how the above server device 10 provides a game to each player. FIG. 10 is a flow diagram showing an operation performed during a game play by the server device 10 according to an embodiment of the present invention. By way of an example, the following description will be based on a case where one entity, team T1, attacks another entity, team T2, in a battle (that is, team T1 is an offense team and team T2 is a defense team).

As shown in FIG. 10, team T1 and team T2 are organized in step 100. Each of the teams consists of a plurality of players. A team may be organized, for example, as follows. i) A list of teams that a player can join is displayed on the terminal device 30 of the player, and the player selects a preferable team from the list to join the team. ii) The server device 10 assigns each player to a certain team in accordance with a condition or in a random manner. The total number of players constituting a team is not limited; by way of an example, each team in this embodiment consists of ten players. When team T1 and team T2 are organized, the team management unit 54 of the server device 10 may manage team T1 and team T2 by using the team management table as shown in FIG. 5, wherein a team identification identifying a team and identifications of the players constituting the team are associated with each other.

Next, in step 102, players constituting each team form a player deck to be used by the players. In this embodiment, each player selects ten cards from his own cards to form a player deck. When each player has formed a player deck, the player deck management unit 57 of the server device 10 manages the player deck of each player constituting each team by using the player deck management table as shown in FIG. 8, wherein a player identification identifying the player, a player deck identification identifying the player deck of the player, and card identifications identifying the cards constituting the player deck are associated with one another. The player deck may also be formed by the player deck management unit 57 instead of each player selecting his own player deck; in this case, the player deck management unit 57 selects cards from the player's cards in accordance with a certain criterion (e.g., a criterion that cards of which a certain characteristic value is high should be preferentially selected) or in a random manner.

Next, in step 104, each team forms a team deck to be used by the team. In this embodiment, each player selects one card to be provided to the team deck, from his own cards. Therefore, a team deck of each team consists of ten cards. The total number of cards constituting a team deck and/or the total number of cards that can be selected by each player to be provided to the team deck are not limited and may be desirably set. For example, a player belonging to a team may select a plurality of cards to be provided to the team deck; and another player belonging to the team may provide no card to the team deck.

When each team has formed a team deck, the team deck management unit 58 of the server device 10 manages the team deck of each team by using the team deck management table as shown in FIG. 9, wherein a team identification identifying the team, a team deck identification identifying the team deck, and card identifications identifying the cards constituting the team deck are associated with one another. The team deck may also be formed by the team deck management unit 58 instead of each player selecting a card to be provided to the team deck; in this case, the team deck management unit 58 selects cards from the player's cards in accordance with a certain criterion (e.g., a criterion that cards of which a certain characteristic value is high should be preferentially selected) or in a random manner.

Next, in step 106, team T1 and team T2 battle with each other. This battle may be performed in various aspects.

In one embodiment of the present invention, each of team T1 and team T2 own a team deck. Players of team T1 attack the team deck of team T2 in cooperation with each other, by using their own player deck. Meanwhile, players of team T2 attack the team deck of team T1 in cooperation with each other, by using their own player deck. By way of an example, the winning condition of a team may be as follows. i) The team that has first defeated all the game cards constituting the team deck of the opposing team shall be the winning team. ii) Each team is provided with points in accordance with the damage imparted on the team deck of the opposing team or the number of defeated cards of the opposing team, and the team that has earned more points shall be the winning team. This embodiment will be hereinafter mainly described in view of player 1 among the ten players constituting team T1 (the same applies in view of other players of team T1 and players of team T2). The points to be provided to each team will be described later in detail.

Figure 11:
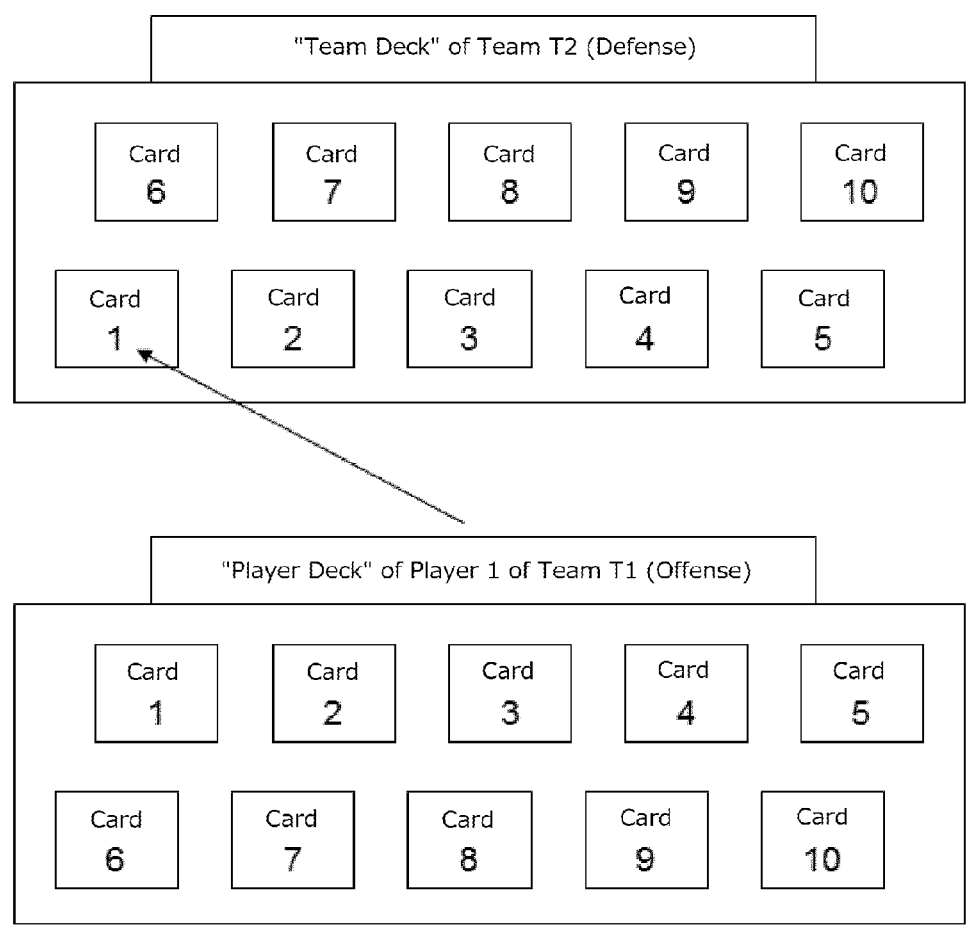
FIG. 11 is a schematic diagram showing a specific example of battling method provided by the server device 10 according to an embodiment of the present invention.

FIG. 11 is a schematic diagram showing a specific example of battling method provided by the server device 10 according to the embodiment. When player 1 of team T1 starts a battle over the team deck of team T2, the display of the terminal device 30 of player 1 displays the team deck of team T2 in the upper portion and the player deck of player 1 in the lower portion, as shown in FIG. 11.

As described above, the team deck of team T2 displayed in the upper portion is formed of cards each provided by a different player of team T2. Cards 1 to 10 of team T2 are provided by player 1 to 10 of team T2, respectively. The player deck of player 1 of team T1, which is displayed in the lower portion, is formed of ten cards selected from cards owned by player 1, as described above.

In this situation, the standby cards of team T1 are cards 1 to 10 constituting the player deck of player 1 of team T1. The standby cards of team T2 are cards 1 to 10 constituting the team deck of team T2. These standby cards may be managed by the standby cards management unit 59 shown in FIG. 3. More specifically, the standby card management unit 59 may generate a management table (standby card management table) as shown in, e.g., FIG. 12, and the management table may be stored in the identification information storage unit 52. As shown in FIG. 12, the standby card management unit 59 assigns, to each team (each player), a team identification (player identification) identifying the team (the player), identifications of the standby cards of the team (the player), and identifications of cards unavailable to the team (the player); these identifications may be stored in the identification information storage unit 52. For example, the standby cards 1 to 10 of team T1 identified by the team identification T001 are respectively identified by card identifications (P001C001, P0100005, P032C015, P052C052, P066C005, P082C016, P098C023, P123C054, P134C010, and P135C082) of the cards constituting the team deck. Likewise, the standby cards 1 to 10 of team T2 identified by the team identification T002 are respectively identified by card identifications (P002C005, P012C025, P022C012, P082C001, P099C112, P111C023, P113C045, P139C001, P142C023, and P158C002) of the cards constituting the team deck. Additionally, the standby cards of player 1 identified by the player identification P001 are respectively identified by card identifications (P001C001, POO1C012, P001C025, P001C026, P001C027, P001C035, P001C052, P001C085, P001C098, and P001C102) of the cards constituting the player deck of player 1. The identification section 60 of the standby card management unit 59 may refer to the standby cards management table stored in the identification information storage unit 52, thereby to identify the standby cards of each team (each player).

Referring back to FIG. 11, (the ten cards constituting) the player deck of player 1 of team T1 battles with card 1 among ten standby cards of team T2 (card 1 has been provided by player 1 of team T2), as represented by the arrow in FIG. 11. By way of an example, a card to battle with player 1 of team T1 may be determined as follows: the battle processing unit 63 of the server device 10 randomly selects one card from the team deck of team T2 for each battle; the battle processing unit 63 draws cards from the team deck of team T2 in a predetermined order; or the battle processing unit 63 causes player 1 of team T1 to select a card from the team deck of team T2. Obviously, the card selected from the team deck of team T2 is selected from the cards registered in the column of "identification of standby card" of the standby card management table shown in FIG. 12. Player 1 of team T2 thus selected and player 1 of team T1 perform an individual battle.

Figure 13:
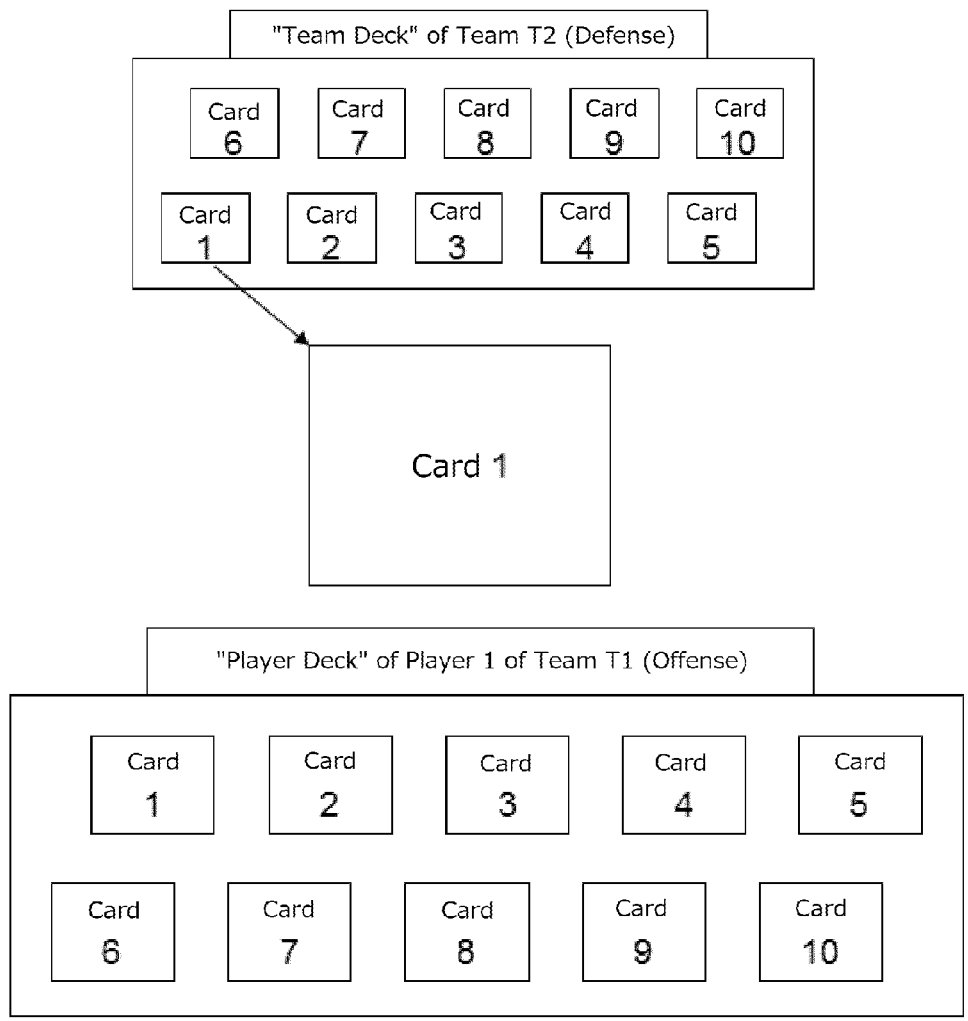
FIG. 13 shows a specific example of a battle screen displayed on the terminal device 30 according to an embodiment of the present invention.

In the individual battle between the player deck of player 1 of team T1 and card 1 of team T2, card 1 of team T2 may be displayed as an enemy character (raid boss) on the terminal device 30 of player 1 of team T1. That is, as shown in FIG. 13, the terminal device of player 1 of team T1 displays a screen wherein the player deck of player 1 of team T1 faces card 1 of team T2 displayed in a large size. In this individual battle, the battle processing unit 63 of the server device 10 compares "total offensive value" (estimation values), which is a total of "offensive values" of cards 1 to 10 of player 1 of team T1, with "physical strength value" (estimation value) corresponding to "rarity value" assigned to card 1 of team T2. By way of an example, the physical strength value corresponding to the rarity value may be calculated as follows: the identification information storage unit 52 stores a conversion table that associates rarity values and physical strength values, and the battle processing unit 63 converts a rarity value of a card into a physical strength value in accordance with this conversion table. For example, the conversion table associates "rarity values" at i) normal, ii) normal+, iii) rare, iv) rare+, and v) super rare levels with "physical strength values" such as 1000, 2000, 3000, 4000, and 10000, respectively. The "physical strength value" corresponding to the "rarity value" assigned to card 1 of team T2 is different from the intrinsic physical strength value of card 1 of team T2. For example, the "physical strength value" corresponding to the "rarity value" is set to a value significantly higher than the intrinsic physical strength value of the card, such that the card can oppose a player deck consisting of a plurality of cards.

In the first turn of an individual battle, calculations are performed as described above to obtain the total offensive value of the player deck of player 1 of team T1 and a physical strength value corresponding to the rarity value of card 1 of team T2, and thereby to calculate the "physical strength value"—the "total offensive value." This calculation result is applied as a new "physical strength value" (that is, player 1 of team T1 has caused damage to player 1 of team T2 to the extent corresponding to the total offensive value). The same calculation is performed in the second and the third turns. The total number of turns is not limited to three but may be any desired number.

If "physical strength value"—"total offensive value" falls to or below zero during the period from the first turn to the third turn, player 1 of team T1 has won the battle. If card 1 of team T2 is displayed as a raid boss, a flash movie representing that player 1 has won the battle may be displayed on the terminal device 30 of player 1 of team T1, followed by the screen shown in FIG. 11. Then, card 1 may be darkened or removed from the team deck of team T2 shown in FIG. 11. In this case, the exclusion section 61 of the standby card management unit 59 excludes card 1 included in the team deck of team T2, a loser, from the standby cards (step 110). More specifically, for example, the exclusion section 61 deletes, from the column of "identification of standby cards" of the standby card management table shown in FIG. 12, the card identification (e.g., P002C005) of card 1 provided to the team deck by player 1 of team T2, and adds it to the column of "identifications of unavailable cards" (see FIG. 14).

Meanwhile, if "physical strength value"—"total offensive value" is greater than zero when the third turn has been over, player 1 of team T1 has been defeated by card 1 of the team deck of team T2. In this case, a flash movie representing that player 1 has lost the battle may be displayed on the terminal device 30 of player 1 of team T1, followed by the screen shown in FIG. 11. In the screen shown in FIG. 11, card 1 of the team deck of team T2 still remains. The game may be configured such that player 1 of team T1, who has lost the battle, may challenge card 1 of the team deck of team T2 again. Simultaneously, a penalty may be assigned to player 1, wherein the server device 10 may store the information representing that player 1 has lost the battle and prohibit player 1 from performing a battle for a certain period of time.

If player 1 of team T1 has won the battle, player 1 of team T1 can subsequently perform an individual battle with another card included in the team deck of team T2 (that is, any of the standby cards of team T2 identified by the identification section 60). The card to perform a battle with player 1 of team T1 may be determined in the method described above. Additionally, the outcome of the battle may be determined as described above. When a player of team T1 other than player 1 (any of players 2 to 10 of team T1) accesses the server device 10 to perform the battle, the screen shown in FIG. 11 is displayed on the terminal devices 30 of players 2 to 10 of team T1 wherein card 1 has been removed from the team deck of team T2. Accordingly, players 2 to 10 of team T1 then perform a battle with the remaining cards (cards 2 to 10) in the team deck of team T2 (any of the standby cards of team T2 identified by the identification section 60). Thus, players 1 to 10 of team T1 tackle a common target of the team deck of team T2; therefore, the members of the team may share a sense of cooperation for progressing the game.

If, as a result of a number of such individual battles, all the cards constituting the team deck of team T2 have been defeated (or the points earned by team T1 have become greater than the points of team T2), a win of team T1 (a defeat of team T2) is determined. Conversely, if all the cards constituting the team deck of team T1 have been defeated (or the points earned by team T2 have become greater than the points of team T1), a win of team T2 (a defeat of team T2) is determined. Then, the winning team can advance to the next stage if it is in a tournament. Additionally, each of the players belonging to the winning team may be provided with in-game money or a game content such as an item in accordance with earned points. Further, each of the players belonging to the winning team may have the characteristic values (e.g., level, offensive value, and/or physical strength value) of his card (e.g., a card included in the team deck used in the battle) increased in accordance with earned points. Such alteration of characteristic values may be achieved by, for example, the characteristic value management unit 56 rewriting the characteristic value management table as shown in FIG. 7.

In each of a plurality of individual battles performed in the battle between team T1 and team T2 described above, the point management unit 64 of the server device 10 provides team T1 with points that is calculated from damage caused by a player of one team (e.g., team T1) by using a card onto a card of a player of the other team (e.g., team T2) (step 108). The points provided to team T1 is inversely proportional to the total number of remaining standby cards of team T2 during the individual battle. More specifically, for example, supposing that the total number N of remaining standby cards of team T2 is ten, when a player of team T1 causes 100 damage onto a card of a player of team T2 in a turn, the point management unit 64 provides 100 points to team T1 in accordance with a point calculation wherein 1 damage corresponds to 1 point, that is, 1+(initial value: 10− the total number of remaining standby cards of team T2: 10)×0.1. Alternatively, supposing that the total number N of remaining standby cards of team T2 is nine (that is, players of team T1 have defeated one card of team T2), when a player of team T1 causes 100 damage onto a card of a player of team T2 in a turn, the point management unit 64 provides 110 points to team T1 in accordance with a point calculation wherein 1 damage corresponds to 1.1 points, that is, 1+(initial value: 10− the total number of remaining standby cards of team T2:9)×0.1. The points provided to team T1 can be calculated by a desired calculation method as far as such points are inversely proportional to the total number of remaining standby cards of team T2. Likewise, team T2 is provided with points inversely proportional to the total number of remaining standby cards of team T1.

The point management unit 64 may provide team T1 with points for each individual battle every time a player of one team (e.g., team T1) defeats one card of a player of the other team (e.g., team T2) by using a card. The points provided to team T1 may also be inversely proportional to the total number of remaining standby cards of team T2 during the individual battle. More specifically, for example, supposing that the total number N of remaining standby cards of team T2 is ten, when a player of team T1 defeats a card of a player of team T2, the point management unit 64 provides team T1 with 300 points, that is, 300×(initial value: 11− the total number of remaining standby cards of team T2: 10). Alternatively, supposing that the total number N of remaining standby cards of team T2 is nine (that is, players of team T1 have defeated one player of team T2), when a player of team T1 defeats a card of a player of team T2, the point management unit 64 provides team T1 with 600 points, that is, 300×(initial value: 11− the total number of remaining standby cards of team T2:9). The points provided to team T1 can be calculated by a desired calculation method as far as such points are inversely proportional to the total number of remaining standby cards of team T2. Likewise, team T2 is provided with points inversely proportional to the total number of remaining standby cards of team T1.

Thus, as a player of one team (e.g., team T1) defeats a larger number of cards of players of the other team (e.g., team T2), the points provided to team T1 increases. Therefore, players of team T1 are motivated to defeat many cards of opposing team to earn points. Players of team T1 are thus continuously attracted during a game play. Further, particularly when the team battle transitions to the latter half (that is, when many individual battles have been performed), team T1 have ordinarily defeated cards of many players of team T2 (the total number of remaining standby cards of team T2 have become smaller). At this moment, offensive players of team T1 can bring more points to team T1 every time they cause damage to a card of a player of team T2 and/or defeat a card of team T2. Meanwhile, the same applies to team T2; in the latter half of a team battle, team T2 may often have a chance to earn more points than team T2. That is, team T1 may possibly have massive points taken by the opposing team; therefore, players of team T1 are kept tense. Thus, players of team T1 are continuously attracted by the game in the latter half of a team battle.

One team (e.g., team T1) is provided with points inversely proportional to the total number of remaining standby cards of the other team (e.g., team T2); therefore, from the standpoint of a player of the other team (team T2), many points may be taken by team T1 opposing team T2. As a countermeasure, in this embodiment, each of the players belonging to team T2 can supplement the team deck of team T2 with a new card when a card included in the team deck of team T2 is defeated (step 1112).

More specifically, when the total number of remaining standby cards of team T2 is equal to or less than nine during an individual battle (that is, when at least one of the cards constituting the team deck of team T2 has been defeated), the battle processing unit 63 prompts each player of team T2 to provide a new card to the team deck from his own cards. Subsequently, when a player of team T2 supplements the team deck of team T2 with a new card (the terminal device 30 of the player notifies the identification of a card for supplement to the server device 10), the team deck management unit 58 adds the identification of the new card into the column of "identifications of cards constituting the team deck" in the team deck management table shown in FIG. 9 in association with team T2 identified by the team identification T002. Further, the supplement section 62 of the standby card management unit 59 may add the identification of the new card into the column of "identification of standby card" of the standby card management table shown in FIG. 12 in association with team T2 identified by the team identification T002. Thus, the identification section 60 of the standby card management unit 59 can identify the new card as a standby card.

For example, supposing that the total number of the remaining standby cards of team T2 is six in an individual battle, when a player of team T1 causes damage to a player of team T2, team T1 is provided with 1.4 points for each 1 damage, that is, 1+(initial value: 10− the total number of remaining standby cards of team T2:6)×0.1. If a player of team T2 supplements the team deck with one card from his own cards, the total number of the remaining standby cards of team T2 becomes seven. Thus, when offensive players of team T1 cause damage to defensive players of team T2, team T1 is only provided with 1.3 points for each 1 damage, that is, 1+(initial value: 10− the total number of remaining standby cards of team T2:7)×0.1.

Thus, even if any of the cards constituting the team deck of team T2 is defeated by a player of team T1, players of team T2 can minimize the points to be provided to team T1 by successively supplementing the team deck with a card. As a result, players concerned in the team battle between team T1 and team T2 are continuously attracted with an enhanced sense of ambience.

The player who can supplement the team deck of team T2 with a card may be any of the players belonging to team T2. Regarding cards that have once been defeated (that is, cards that have been excluded before from standby cards by the exclusion section 61 of the standby card management unit 59), the supplement section 62 may be configured to supplement the team deck of team T2 only with cards satisfying a predetermined condition among such cards. The predetermined condition may be, for example, i) that a certain period of time has elapsed since the card was excluded by the exclusion section 61, ii) that the card has been defeated only once, or iii) that a characteristic value assigned to the card satisfies a certain criterion (e.g., the criterion that the rarity value is normal+ or normal). Instead, the supplement section 62 may unconditionally supplement the team deck of team T2 with such cards that have been defeated before. Obviously, each player of team T2 may supplement the team deck with not only cards that have been defeated before but new cards (that is, cards that have never been excluded by the exclusion section 61). Players of team T1 may likewise supplement the team deck with cards.

FIG. 10 shows an example wherein a battle process (step 106) includes, for convenience, providing points (step 108), excluding a card (step 110), and supplementing a deck with a card (step 112) performed sequentially. These steps 108 to 112 are not necessarily performed in this order but may be performed in a desired order.

After various team battles including the above described example team battles are performed by various teams including team T1 and team T2, each of the teams may be ranked in accordance with the points earned by the team in the team battles.

Figure 16:
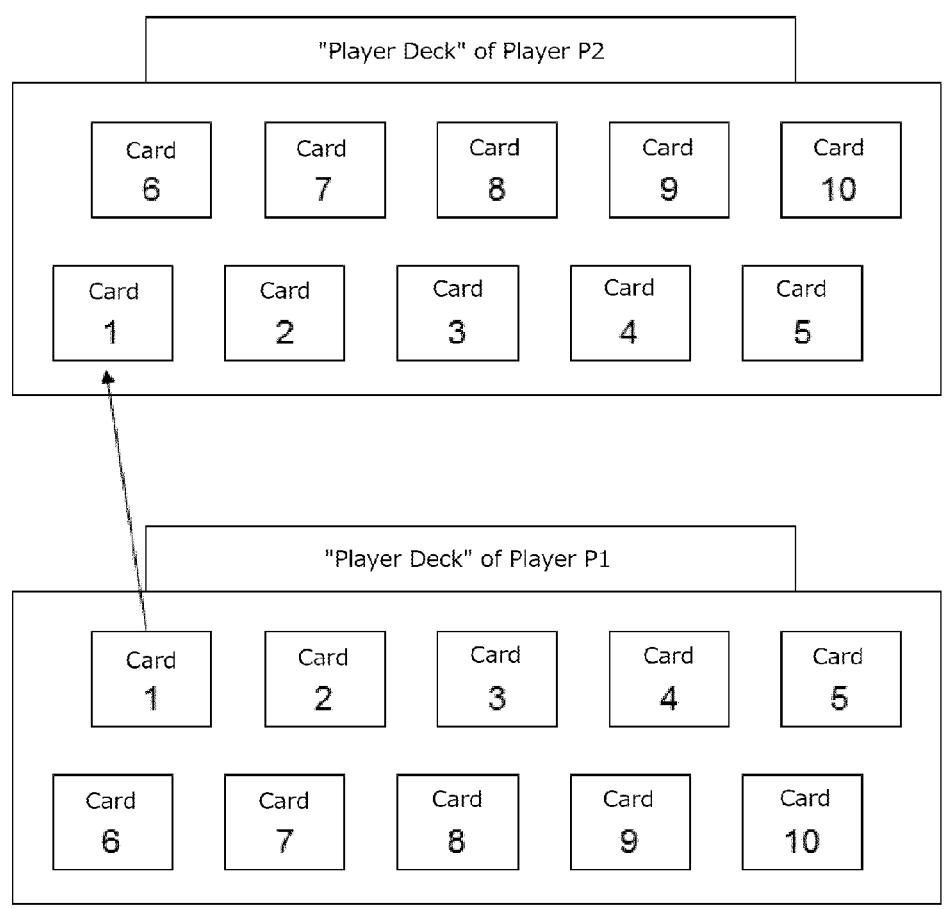
FIG. 16 is a schematic diagram showing another specific example of battling method provided by the server device 10 according to an embodiment of the present invention.

The description heretofore was based on the case where one entity, team T1, battles with the other entity, team T2. The following description is based on the case where one entity, player P1 battles with the other entity, player P2. FIG. 16 is a schematic diagram showing another specific example of battling method provided by the server device 10 according to an embodiment of the present invention.

In FIG. 16, the upper portion is a player deck constituted by cards 1 to 10 of player P2, and the lower portion is a player deck constituted by cards 1 to 10 of player P1. At this moment, standby cards of player P1 are cards 1 to 10; likewise, standby cards of player P2 are also cards 1 to 10. These standby cards may be identified by the identification section 60 of the standby card management unit 59 by using the standby card management table (stored in the identification information storage unit 52) for each of the players shown in FIG. 12.

The battle processing unit 63 alternately grants offense turns to player P1 and player P2. One player, granted an offense turn, attacks the other player from the first turn to the third turn, for example. When the offense turn of one player is over, the other player is granted an offense turn. Each of these offense turns corresponds to an individual battle.

More specifically, player P1, granted an offense turn, may select any one of the standby cards (e.g., card 1 as shown) and attack any one of the standby cards of player P2 (e.g., card 1 as shown) in the offense turn of player P1 (an individual battle). In each of the turns from the first turn to the third turn, the offensive value (estimation value) assigned to card 1 of player P1 is compared with the physical strength value (estimation value) assigned to card 1 of player P2, The physical strength value of card 1 of player P2 is updated with a new value of "physical strength value"—"offensive value" (that is, "offensive value" corresponds to the damage caused to card 1 of player P2 by card 1 of player P1). If "physical strength value"—"offensive value" falls to or below zero during the turns from the first turn to the third turn, card 1 of player P2 is defeated (card 1 of player P1 wins). In this case, the exclusion section 61 excludes card 1 from the standby cards of player P2. If "physical strength value"—"offensive value" is greater than zero when the third turn is over, the individual battle between card 1 of player P1 and card 1 of player P2 ends in a draw.

Next, an offense turn is granted to player P2. Player P2 may select any one of the standby cards (e.g., card 3) and attack any one of the standby cards of player P1 (e.g., card 5) in its offense turn (an individual battle). The above turns from the first turn to the third turn are likewise performed, and the outcome of the individual battle between card 3 of player P2 and card 5 of player P1 is determined. If card 5 of player P1 is defeated, the exclusion section 61 excludes card 5 from the standby cards of player P1 as described above.

The offense turns as described above are alternately granted to player 1 and player P2. If all the cards constituting the player deck of player P2 have been defeated (or the points earned by player P1 have become greater than the points of player P2), a win of player P1 (a defeat of player P2) is determined. Conversely, if all the cards constituting the player deck of player P1 have been defeated (or the points earned by player P2 have become greater than the points of player P1), a win of player P2 (a defeat of player P1) is determined.

The methods of battling between player P1 and player P2 using the player deck are not limited to those described above.

Any modification is possible as far as an individual battle is performed between a card selected from the cards (standby cards) constituting the player deck of player P1 and a card selected from the cards (standby cards) constituting the player deck of player P2, and the outcome of the individual battle is determined by comparison between an estimation value calculated using characteristic values assigned to one of the cards and an estimation value calculated using characteristic values assigned to the other of the cards, and the card determined to be a loser is excluded from the standby cards.

In the battle described with reference to FIG. 16, the point management unit 64 may provide points and the supplement section 62 may supplement a deck with cards, in the same manner as in the battle described with reference to FIG. 11. That is, in short, when a card of one player causes damage to a card of the other player, and/or when a card of one player defeats a card of the other player, the one player may be provided with points inversely proportional to the total number of standby cards of the other player. Also, when a card of one player is defeated, the one player may supplement the standby cards with a new card and/or a card that has been defeated before. In the battle shown in FIG. 16, points may be provided and decks may be supplemented with cards in the same manner as detailed with reference to FIG. 11.

In various embodiments described above, both one entity and the other entity may be a player operated by a human and/or a team constituted by a plurality of players operated by humans. Also, any one of one entity and the other entity may be a player operated by a computer and/or a team constituted by a plurality of players operated by computers.

The processes and procedures described and illustrated herein may be implemented by software, hardware, or any combination thereof, as well as that explicitly stated in the embodiments. More specifically, the processes and procedures described and illustrated herein may be implemented by the installation of the logic corresponding to the processes into a medium such as an integrated circuit, a volatile memory, a non-volatile memory, a magnetic disk, or an optical storage. The processes and procedures described and illustrated herein may also be installed in the form of a computer program, and executed by various computers.

If the processes and procedures has been described and illustrated herein to be executed by a single device, software, component, or module, such processes or procedures may also be executed by a plurality of devices, a plurality of pieces of software, a plurality of components, and/or a plurality of modules. The data, table, or database described and illustrated herein to be stored in a single memory may also be distributed to and stored in a plurality of memories included in a single device or a plurality of memories which are located in a plurality of devices in a distributed manner. Furthermore, the software and hardware elements described and illustrated herein may also be integrated into a smaller number of constituent elements or separated into a larger number of constituent elements.

If it is herein described that the invention comprises one element or a plurality of elements, the invention may comprise either one element or a plurality of elements.

What is claimed is:

1. A server device for providing a game wherein a first entity and a second entity battle with each other, the server device comprising:

an identification unit configured to identify one or more first game contents on standby among one or more game contents available to the first entity and identify one or more second game contents on standby among one or more game contents available to the second entity;

a battle processing unit configured to compare, in an individual battle between one or more first game contents selected from the first game contents on standby and one or more second game contents selected from the second game contents on standby, a first estimation value calculated from a characteristic value of the selected first game contents with a second estimation value calculated from a characteristic value of the selected second game contents, thereby to determine an outcome of the individual battle;

an exclusion unit configured to exclude the selected second game contents determined to be a loser by the battle processing unit from the second game contents on standby; and a point providing unit configured to provide the first entity satisfying a predetermined condition in the individual battle with points calculated by multiplying a predetermined value by a coefficient, the value of the coefficient increasing as a total number of the second game contents on standby in the individual battle decreases.

2. The server device of claim 1, wherein the first entity is a first player, and wherein the identification unit identifies, as the first game contents on standby, a game content group constituted by specific game contents selected from one or more game contents available to the first player, the game content group being used only by the first player.

3. The server device of claim 1, wherein the first entity is a first team constituted by a plurality of players, and wherein the identification unit identifies, as the first game contents on standby, a game content group constituted by specific game contents selected from one or more game contents available to the plurality of players, the game content group being used only by the first team.

4. The server device of claim 1, wherein the point providing unit provides points inversely proportional to a total number of the second game contents on standby.

5. The server device of claim 1, further comprising a supplement unit configured to supplement the second game contents on standby with one or more game contents selected from the game contents available to the second entity.

6. A method using a computer for providing a game wherein a first entity and a second entity battle with each other, the method comprising:

identifying one or more first game contents on standby among one or more game contents available to the first entity and identifying one or more second game contents on standby among one or more game contents available to the second entity;

comparing, in an individual battle between one or more first game contents selected from the first game contents on standby and one or more second game contents selected from the second game contents on standby, a first estimation value calculated from a characteristic value of the selected first game contents with a second estimation value calculated from a characteristic value of the selected second game contents, thereby to determine an outcome of the individual battle;

excluding the selected second game contents determined to be a loser by the battle processing unit from the second game contents on standby; and providing the first entity satisfying a predetermined condition in the individual battle with points calculated by multiplying a predetermined value by a coefficient, the value of the coefficient increasing as a total number of the second game contents on standby in the individual battle decreases.

* * * * *